(12) United States Patent
Shin et al.

(10) Patent No.: US 12,278,337 B2
(45) Date of Patent: Apr. 15, 2025

(54) ELECTROLYTE COMPOSITION, GEL POLYMER ELECTROLYTE AND LITHIUM SECONDARY BATTERY INCLUDING THE SAME

(71) Applicant: LG ENERGY SOLUTION, LTD., Seoul (KR)

(72) Inventors: Won Kyung Shin, Daejeon (KR); Kyoung Ho Ahn, Daejeon (KR); Jun Hyeok Han, Daejeon (KR); Su Hyeon Ji, Daejeon (KR); Chul Haeng Lee, Daejeon (KR); Min Jung Kim, Daejeon (KR); Won Tae Lee, Daejeon (KR); Young Ho Oh, Daejeon (KR); You Kyeong Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/270,796

(22) PCT Filed: Jul. 14, 2022

(86) PCT No.: PCT/KR2022/010297
§ 371 (c)(1),
(2) Date: Jul. 3, 2023

(87) PCT Pub. No.: WO2023/287227
PCT Pub. Date: Jan. 19, 2023

(65) Prior Publication Data
US 2023/0395848 A1    Dec. 7, 2023

(30) Foreign Application Priority Data

Jul. 15, 2021  (KR) .................. 10-2021-0092618
Jul. 13, 2022  (KR) .................. 10-2022-0086457

(51) Int. Cl.
  *H01M 10/0565*  (2010.01)
  *H01M 10/0525*  (2010.01)
  *H01M 50/46*    (2021.01)

(52) U.S. Cl.
  CPC ... *H01M 10/0565* (2013.01); *H01M 10/0525* (2013.01); *H01M 50/46* (2021.01); *H01M 2300/0082* (2013.01)

(58) Field of Classification Search
  CPC ......... H01M 10/0565; H01M 10/0525; H01M 50/46; H01M 2300/0082
  (Continued)

(56) References Cited

U.S. PATENT DOCUMENTS 6,673,496 B1      1/2004  Nakagawa et al.
2008/0090154 A1 *  4/2008  Ihara ................ H01M 10/0568
                                                    429/188

(Continued)

FOREIGN PATENT DOCUMENTS

JP    2012-119091 A      6/2012
JP    2012119091    *    6/2012

(Continued)

OTHER PUBLICATIONS

JP2012119091 MT (Year: 2012).*

(Continued)

*Primary Examiner* — Alexander Usyatinsky
(74) *Attorney, Agent, or Firm* — MORGAN, LEWIS & BOCKIUS LLP

(57) ABSTRACT

The present invention relates to an electrolyte composition including a lithium salt; a non-aqueous organic solvent; a compound represented by a specific formula; and a perfluoropolyether oligomer, a gel polymer electrolyte including a polymer network which is formed by a polymerization (Continued)

reaction of the electrolyte composition, and a lithium secondary battery including the same.

21 Claims, 2 Drawing Sheets

(58) Field of Classification Search
USPC ............................................. 429/316
See application file for complete search history.

(56) References Cited

U.S. PATENT DOCUMENTS

| | | | |
|---|---|---|---|
| 2010/0160595 A1* | 6/2010 | Klun | C09D 175/16 |
| | | | 528/72 |
| 2013/0136998 A1* | 5/2013 | Hwang | H01M 10/0565 |
| | | | 429/188 |
| 2015/0132639 A1 | 5/2015 | Kodama | |
| 2016/0351956 A1* | 12/2016 | Lee | H01M 10/052 |
| 2016/0351959 A1* | 12/2016 | Suzuki | H01M 10/0569 |
| 2017/0229735 A1 | 8/2017 | Ahn et al. | |
| 2017/0373347 A1 | 12/2017 | Lee et al. | |
| 2021/0057780 A1 | 2/2021 | Oh et al. | |
| 2021/0257659 A1 | 8/2021 | Park et al. | |
| 2022/0311050 A1 | 9/2022 | Yamazaki et al. | |

FOREIGN PATENT DOCUMENTS

| | | | |
|---|---|---|---|
| JP | 2016-219423 A | | 12/2016 |
| KR | 10-2013-0058403 A | | 6/2013 |
| KR | 10-2014-0043662 A | | 4/2014 |
| KR | 20140052241 | * | 5/2014 |
| KR | 10-2016-0040127 A | | 4/2016 |
| KR | 10-2020-0034373 A | | 3/2020 |
| KR | 10-2020-0036789 A | | 4/2020 |
| WO | 99/028986 A1 | | 6/1999 |
| WO | 2021/020005 A1 | | 2/2021 |

OTHER PUBLICATIONS

KR-201400522MT (Year: 2014).*
The decision of JPO to grant a Patent for Application JP 2023525603 (Year: 2024).*
International Search Report and Written Opinion dated Oct. 21, 2022, for corresponding International Patent Application No. PCT/KR2022/010297.

* cited by examiner

ELECTROLYTE COMPOSITION, GEL POLYMER ELECTROLYTE AND LITHIUM SECONDARY BATTERY INCLUDING THE SAME

CROSS-REFERENCE TO RELATED APPLICATIONS

This application claims priority from Korean Patent Application Nos. 10-2021-0092618, filed on Jul. 15, 2021, and 10-2022-0086457, filed on Jul. 13, 2022, the disclosures of which are incorporated by reference herein.

TECHNICAL FIELD

The present invention relates to an electrolyte composition, a gel polymer electrolyte, and a lithium secondary battery including the same.

BACKGROUND ART

Recently, there is a growing demand for high stability lithium ion secondary batteries as personal IT devices and computer networks are developed with the development of information society and the accompanying dependency of society as a whole on electrical energy is increased. Particularly, in line with miniaturization and lightweight trends of electronic and communication devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

The lithium ion battery is advantageous in that it may achieve high capacity, but is disadvantageous in that there is a risk of leakage and explosion due to the use of the liquid electrolyte containing a lithium salt and battery design becomes complicated in order to improve this.

The lithium polymer battery is advantageous in that flexibility is high and leakage is improved due to the use of a solid polymer electrolyte or a gel polymer electrolyte containing an electrolyte solution as the electrolyte, but is disadvantageous in that ionic conductivity is relatively lower than that of the lithium ion battery due to a decrease in mobility of lithium ions by a polymer matrix formed in the polymer electrolyte. However, the range of use of the lithium polymer battery is gradually expanding in terms of the fact that the lithium polymer battery may suppress a side reaction between an electrode surface and the electrolyte and has high stability.

Among the lithium polymer batteries, the lithium polymer battery using the gel polymer electrolyte may be prepared through a step of (i) after forming a gel polymer electrolyte layer by coating an electrolyte solution composition, in which an organic solvent, in which an electrolyte salt is dissolved, a polymerization initiator, and a polymerizable monomer or oligomer are mixed, on one or both surfaces of one of an electrode and a separator and curing (gelating) using heat or UV, preparing an electrode assembly by winding or stacking the electrode or separator on which the gel polymer electrolyte layer has been formed, inserting the electrode or separator into a battery case, and then re-injecting a liquid electrolyte solution to impregnate the gel polymer electrolyte layer, or may be prepared through a step of (ii) injecting the electrolyte solution composition into the battery case accommodating the electrode assembly, and then gelating (crosslinking) by providing an appropriate temperature.

In this regard, when the lithium polymer battery is prepared by a method of injecting the electrolyte solution composition into the battery case accommodating the electrode assembly, since surface tension of the electrolyte solution composition is increased due to pre-gelation of the electrolyte solution composition at room temperature, there is a problem in that wetting to the electrode is reduced. This problem leads to degradation of overall performance of the secondary battery in the future.

Thus, there is a need to develop a technique for an electrolyte solution composition having improved wettability during preparation of a secondary battery including a gel polymer electrolyte.

DISCLOSURE OF THE INVENTION

Technical Problem

An aspect of the present invention provides an electrolyte composition having improved wettability to an electrode.

Another aspect of the present invention provides a gel polymer electrolyte in which rigidity and lithium ion conductivity of a polymer matrix as well as flame retardancy are improved by including a polymer network which is formed by a polymerization reaction of the electrolyte composition.

Another aspect of the present invention provides a lithium secondary battery in which cycle characteristics are improved by including the gel polymer electrolyte.

Technical Solution

According to an aspect of the present invention, there is provided an electrolyte composition including:
a lithium salt;
a non-aqueous organic solvent;
a compound represented by Formula 1 below; and
a perfluoropolyether oligomer.

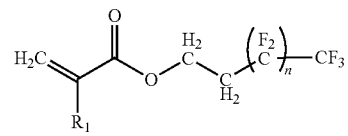

[Formula 1]

In Formula 1,
$R_1$ is hydrogen or an alkyl group having 1 to 3 carbon atoms, and
n is an integer of 3 to 8.

According to another aspect of the present invention, there is provided a gel polymer electrolyte including a polymer network which is formed by a polymerization reaction of the electrolyte composition of the present invention.

According to another aspect of the present invention, there is provided a lithium secondary battery including a positive electrode; a negative electrode; a separator disposed between the negative electrode and the positive electrode; and the gel polymer electrolyte of the present invention.

Advantageous Effects

Since an electrolyte composition of the present invention improves wettability of the electrolyte composition by including a perfluoropolyether oligomer and a low molecular weight fluorine-based monomer, a gel polymer electrolyte having improved rigidity of a polymer matrix and mobility of lithium ions as well as flame retardancy may be prepared. Furthermore, a lithium secondary battery having improved cycle characteristics may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
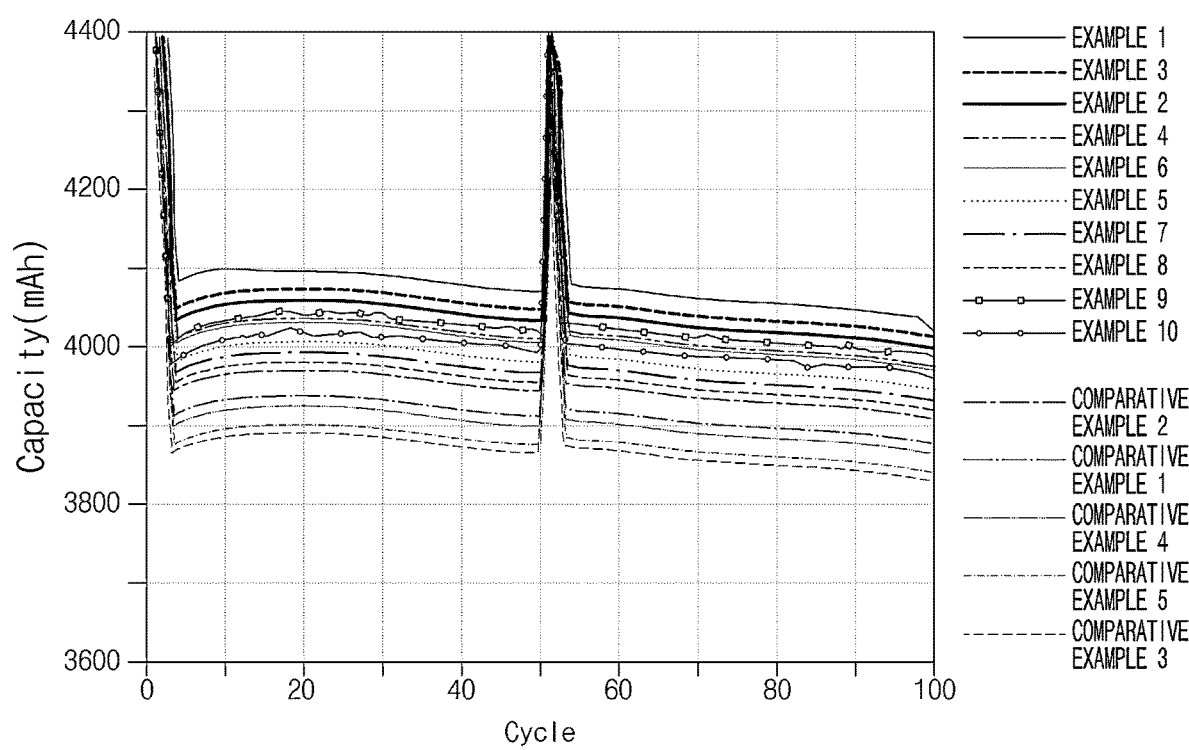
FIG. 1 is a graph illustrating the evaluation results of low-temperature cycle characteristics of a secondary battery according to Experimental Example 1.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Also, the terms used in the present specification are used to merely describe exemplary embodiments, but are not intended to limit the invention. The terms of a singular form may include plural forms unless referred to the contrary.

Before describing the present invention, it will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

The expressions "a" and "b" in the description of "a to b carbon atoms" in the present specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —CH$_2$—, —CH$_2$CH$_2$—, —CH$_2$CH$_2$CH$_2$—, —CH$_2$ (CH$_3$)CH—, —CH(CH$_3$)CH$_2$—, and —CH(CH$_3$)CH$_2$CH$_2$—.

The expression "alkylene group" denotes a branched or unbranched divalent unsaturated hydrocarbon group. In an embodiment, the alkylene group may be substituted or unsubstituted. The alkylene group may include a methylene group, an ethylene group, a propylene group, an isopropylene group, a butylene group, an isobutylene group, a tert-butylene group, a pentylene group, and 3-pentylene group.

Furthermore, unless otherwise defined in the specification, the expression "substitution" denotes that at least one hydrogen bonded to carbon is substituted with an element other than hydrogen, for example, an alkyl group having 1 to 6 carbon atoms or fluorine.

Electrolyte Composition

According to an embodiment, the present invention provides an electrolyte composition including:
a lithium salt;
a non-aqueous organic solvent;
a compound represented by Formula 1 below; and
a perfluoropolyether oligomer.

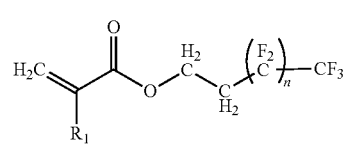

[Formula 1]

In Formula 1,
R$_1$ is hydrogen or an alkyl group having 1 to 3 carbon atoms, and
n is an integer of 3 to 8.

(1) Lithium Salt

First, a lithium salt will be described as follows.

Any lithium salt typically used in an electrolyte for a lithium secondary battery may be used as the lithium salt without limitation, and, for example, the lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, B$_{10}$Cl$_{10}^-$, AlCl$_4^-$, AlO$_4^-$, PF$_6^-$, CF$_3$SO$_3^-$, CH$_3$CO$_2^-$, CF$_3$CO$_2^-$, AsF$_6^-$, SbF$_6^-$, CH$_3$SO$_3^-$, (CF$_3$CF$_2$SO$_2$)$_2$N$^-$, (CF$_3$SO$_2$)$_2$N$^-$, (FSO$_2$)$_2$N$^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, C$_4$F$_9$SO$_3^-$, CF$_3$CF$_2$SO$_3^-$, CF$_3$CF$_2$ (CF$_3$)$_2$CO$^-$, (CF$_3$SO$_2$)$_2$CH$^-$, CF$_3$ (CF$_2$) 7SO$_3^-$, and SCN$^-$ as an anion.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiFSI (lithium bis(fluorosulfonyl)imide, LiN(SO$_2$F)$_2$), LiBETI (lithium bis(pentafluoroethanesulfonyl)imide, LiN (SO$_2$CF$_2$CF$_3$)$_2$), and LiTFSI (lithium bis(trifluoromethanesulfonyl)imide, LiN(SO$_2$CF$_3$)$_2$) or a mixture of two or more thereof, and, in addition to the above-described lithium salt, a lithium salt typically used in an electrolyte solution of a lithium secondary battery may be used without limitation. Specifically, the lithium salt may include LiPF$_6$.

The lithium salt may be appropriately changed in a normally usable range, but may be included in a concentration of 0.8 M to 3.0 M, for example, 1.0 M to 3.0 M in the electrolyte solution to obtain an optimum effect of forming a film for preventing corrosion of the surface of the electrode. In a case in which the concentration of the electrolyte salt satisfies the above range, viscosity of the non-aqueous electrolyte solution may be controlled to achieve optimal impregnability, a film forming effect may be improved, and an effect of improving capacity characteristics and cycle characteristics of the lithium secondary battery may be obtained by improving mobility of lithium ions.

(2) Non-Aqueous Organic Solvent

Also, a non-aqueous organic solvent will be described as follows.

Various organic solvents typically used in a lithium electrolyte may be used as the non-aqueous organic solvent without limitation, wherein a type of the non-aqueous organic solvent is not limited as long as it may minimize decomposition due to an oxidation reaction during charge and discharge of the secondary battery and may exhibit desired characteristics with an additive.

Specifically, the non-aqueous organic solvent may include at least one of a highly viscous cyclic carbonate-based organic solvent, which well dissociates the lithium salt in the electrolyte due to high permittivity, and a linear carbonate-based organic solvent having low viscosity and low dielectric constant.

The cyclic carbonate-based organic solvent may include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

The linear carbonate-based organic solvent may include at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and may specifically include ethylmethyl carbonate (EMC).

In the present invention, the cyclic carbonate-based organic solvent may be mixed with the linear carbonate-based organic solvent and used, and a mixing ratio of the cyclic carbonate-based organic solvent to the linear carbonate-based organic solvent may be a volume ratio of 10:90 to 80:20, for example, 50:50 to 70:30.

When the volume ratio of the cyclic carbonate-based organic solvent to the linear carbonate-based organic solvent satisfies the above range, an electrolyte composition having higher electrical conductivity may be prepared.

Furthermore, the electrolyte composition of the present invention may further include a linear ester-based organic solvent and/or a cyclic ester-based organic solvent, which has relatively higher stability during high-temperature and high-voltage operation than the cyclic carbonate-based organic solvent, to improve disadvantages of the cyclic carbonate-based organic solvent that causes gas generation during the high-voltage operation and simultaneously achieve high ionic conductivity.

Specific examples of the linear ester-based organic solvent may include at least one selected from the group consisting of methyl acetate, ethyl acetate, propyl acetate, methyl propionate, ethyl propionate, propyl propionate, and butyl propionate, and may specifically include at least one of ethyl propionate and propyl propionate.

Also, the cyclic ester-based organic solvent may include at least one selected from the group consisting of γ-butyrolactone, γ-valerolactone, γ-caprolactone, σ-valerolactone, and ε-caprolactone.

In the electrolyte composition of the present invention, the remainder except for other components other than the non-aqueous organic solvent, for example, the lithium salt, the compound represented by Formula 1, and the oligomer, may be the organic solvent unless otherwise specified.

(3) Compound Represented by Formula 1

The electrolyte composition of the present invention may include a compound represented by the following Formula 1 as a low molecular weight fluorine-based monomer.

In Formula 1, $R_1$ is hydrogen or an alkyl group having 1 to 3 carbon atoms, and n is an integer of 3 to 8.

Since the compound represented by Formula 1 includes a double bond (C=C) functional group included in a molecular structure, a robust solid electrolyte interface (SEI) containing a fluorine element may be more easily formed on a surface of a negative electrode during an electrochemical decomposition reaction. Also, since the compound represented by Formula 1 includes three or more fluorine elements having excellent flame retardancy and incombustibility, a passivation film capable of securing excellent oxidation resistance may be formed on a surface of a positive electrode. Furthermore, since the compound represented by Formula 1 of the present invention includes two oxygen elements in the molecular structure, it has higher oxidation stability than a compound including three or more oxygen elements in its molecular structure, and thus, a robust SEI with low resistance may be formed on the surface of the electrode.

Particularly, since the compound represented by Formula 1 of the present invention has a structural feature in which an acrylate functional group and a terminal fluorine-substituted alkyl group are connected (bonded) through an ethylene group ($-CH_2-CH_2-$), it may ensure higher flexibility due to an increase in molecular chain of a linker moiety than a compound such as 2,2,3,3,4,4,4-heptafluoro butyl acrylate in which an acrylate functional group and a terminal fluorine-substituted alkyl group are connected through a methylene group ($-CH_2-$). Thus, during preparation of a gel polymer electrolyte, the compound represented by Formula 1 may be uniformly distributed in a polymer matrix structure formed of a perfluoropolyether oligomer to be described later to form the flexible polymer matrix structure and prepare a gel polymer electrolyte with improved mechanical stability and lithium ion mobility.

In Formula 1, $R_1$ may be hydrogen, n may be an integer of 4 to 8, and n may specifically be an integer of 5 to 8.

In Formula 1, in a case in which the integer value of n satisfies the above range, since thermal properties of the compound itself may be increased, stability of a film formed therefrom may be expected. Specifically, in Formula 1, if n is 3 or more, since the fluorine atom is included above a certain level, flame retardancy and high-temperature durability of the electrolyte composition are improved, and gas generation and swelling phenomenon may be suppressed during high-temperature storage. Also, in Formula 1, if n is 8 or less, since an increase in viscosity and non-polarity of the electrolyte composition due to an excessive amount of the fluorine element may be prevented and solubility of the compound in the electrolyte composition may be improved, performance degradation of the secondary battery may be prevented.

Specifically, the compound represented by Formula 1 may include at least one of oligomers represented by Formulae 1-1 and 1-2 below.

[Formula 1]

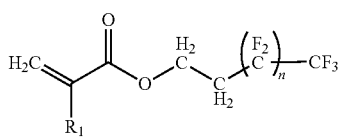

[Formula 1-1]

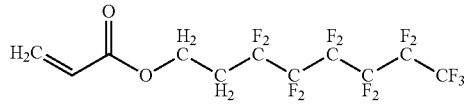

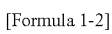

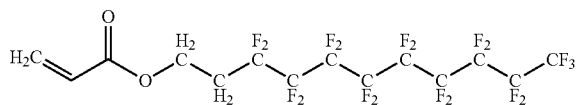

(4) Perfluoropolyether Oligomer

The electrolyte composition of the present invention may include a perfluoropolyether oligomer.

The perfluoropolyether oligomer may include an oligomer represented by Formula 2 below.

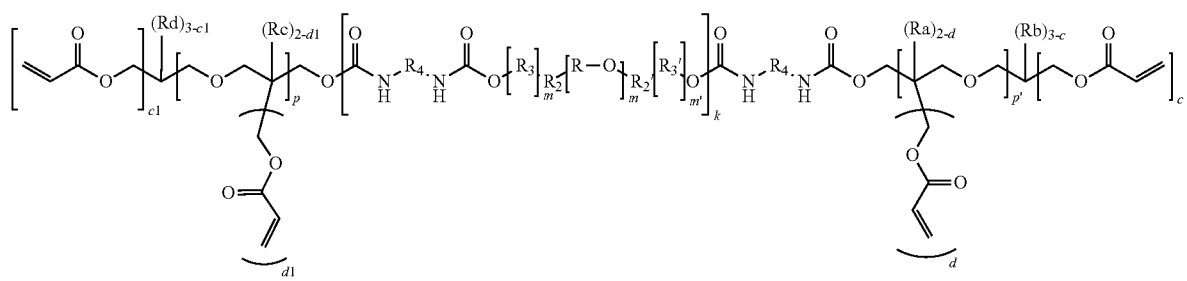

In Formula 2,

R is an alkylene group having 1 to 4 carbon atoms which is unsubstituted or substituted with fluorine, $R_2$ and $R_2'$ are each independently an alkylene group having 1 to 5 carbon atoms or $—(CF_2)_o—O—$ (o is an integer of 1 to 3), $R_3$ and $R_3'$ are each independently an alkylene group having 1 to 5 carbon atoms or $—(R_5)O_2—O—$ ($R_5$ is an unsubstituted or substituted alkylene group having 1 to 5 carbon atoms, and o2 is an integer of 1 to 3), $R_4$ is an aliphatic hydrocarbon group, an alicyclic hydrocarbon group, or an aromatic hydrocarbon group, Ra, Rb, Rc, and Rd are each independently hydrogen or an alkyl group having 1 to 3 carbon atoms, n, m, and m' are each independently an integer of 1 to 10, k is an integer of 10 to 1,000, p and p' are each independently an integer of 0 or 1, c and c1 are each independently an integer of 1 to 3, and d and d1 are each independently an integer of 1 or 2.

Since the perfluoropolyether oligomer represented by Formula 2 includes a hydrophilic acrylate group capable of forming a cross-link by itself at both ends of its structure, a perfluoropolyether group, as a hydrophobic moiety, in a main chain, and a urethane group and/or a urea group in the structure, it may secure a balanced affinity with the positive electrode or a separator, as a hydrophilic part, and the negative electrode or a separator fabric, as a hydrophobic part, the viscosity and surface tension of the electrolyte composition may be reduced. It may reduce interfacial resistance by ensuring wetting of the electrolyte composition even when the lithium salt is included in a high concentration of 1.5 M or more in the electrolyte composition. Thus, it may improve the impregnability of the electrolyte composition for the electrode and the separator.

Furthermore, since the perfluoropolyether oligomer, as an electrochemically stable compound with high reduction stability, has ability to dissociate the lithium salt, it may minimize a reduction reaction on the surface of the negative electrode and may improve lithium ion mobility.

Accordingly, with respect to a gel polymer electrolyte prepared by using the electrolyte composition including such a perfluoropolyether oligomer, since the side reaction with the electrode is reduced and the interfacial resistance between the electrode and the electrolyte is reduced in comparison to a conventional gel polymer electrolyte prepared by using a polymer having an alkylene oxide skeleton such as ethylene oxide, propylene oxide, and butylene oxide; or dialkyl siloxane, fluorosiloxane, or block copolymer and graft polymer having units thereof, a lithium secondary battery with improved overall performance, such as cycle life characteristics, may be prepared.

In Formula 2, the aliphatic hydrocarbon group may be an alkylene group having 1 to 20 carbon atoms; an alkylene group having 1 to 20 carbon atoms which contains an isocyanate group (NCO); an alkoxylene group having 1 to 20 carbon atoms; an alkenylene group having 2 to 20 carbon atoms; or an alkynylene group having 2 to 20 carbon atoms.

Also, in Formula 2, the alicyclic hydrocarbon group may be a cycloalkylene group having 4 to 20 carbon atoms; a cycloalkenylene group having 4 to 20 carbon atoms; and a heterocycloalkylene group having 2 to 20 carbon atoms.

Furthermore, in Formula 2, the aromatic hydrocarbon group may be an arylene group having 6 to 20 carbon atoms; or a heteroarylene group having 2 to 20 carbon atoms.

Specifically, in Formula 2, R is an alkylene group having 2 to 4 carbon atoms which is unsubstituted or substituted with fluorine, $R_2$ and $R_2'$ are each independently an alkylene group having 1 to 3 carbon atoms or $—(CF_2)_o—O—$ (o is an integer of 1 to 3), $R_3$ and $R_3'$ are each independently an alkylene group having 2 to 5 carbon atoms or $—(R_5)_{o2}—O—$ ($R_5$ is an unsubstituted or substituted alkylene group having 2 to 5 carbon atoms, and o2 is an integer of 1 to 3), $R_4$ is an alicyclic hydrocarbon group, and Ra, Rb, Rc, and Rd may each independently be hydrogen or an alkyl group having 1 or 2 carbon atoms.

The oligomer represented by Formula 2 may include an oligomer represented by Formula 2-1 or Formula 2-2 below.

[Formula 2-1]

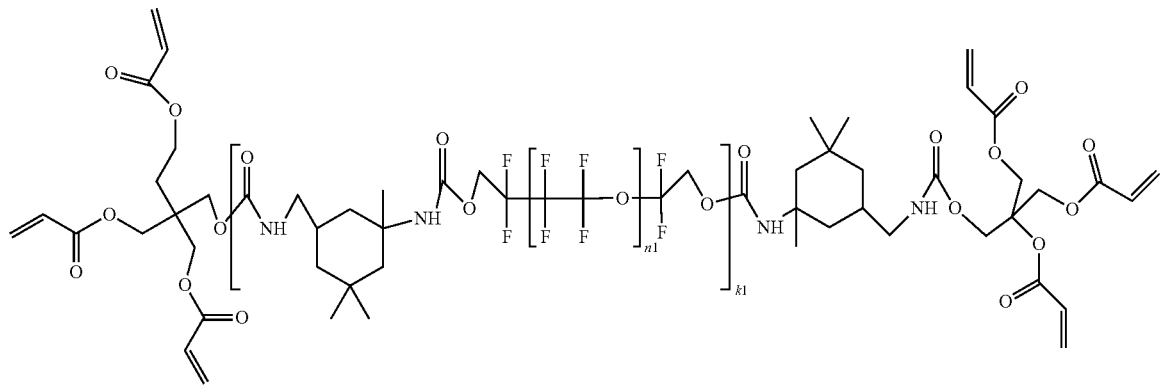

In Formula 2-1,
n1 is an integer of 1 to 10, and
k1 is an integer of 10 to 1,000.

[Formula 2-2]

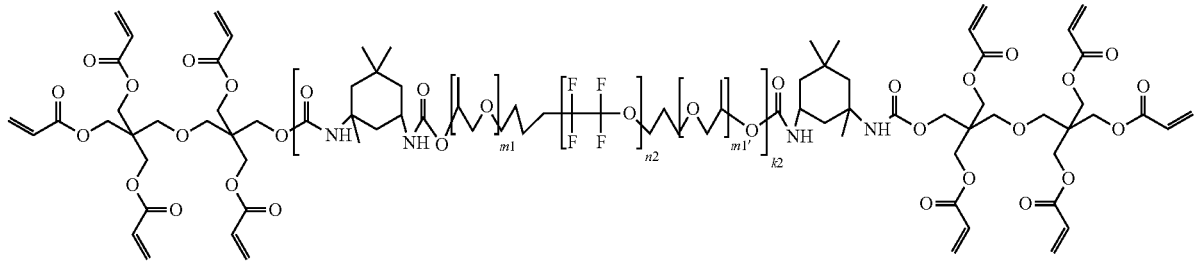

In Formula 2-2,
n2, m1, and m1' are each independently an integer of 1 to 10, and
k2 is an integer of 10 to 1,000.

Specifically, the oligomer represented by Formula 2 may include the oligomer represented by Formula 2-2.

That is, since the oligomer represented by Formula 2 includes a polypropylene oxide unit, which may help the dissociation of the lithium salt in a main chain structure, may facilitate transfer of lithium ions, and may provide flexible performance to the polymer main chain, as a repeating unit, the number of movable lithium ions in the electrolyte is increased, the mobility of the lithium ion itself is increased, and polymer motility is increased, and thus, low-temperature cycle and output characteristics of the secondary battery may be further improved.

The perfluoropolyether oligomer may be included in an amount of 0.1 wt % to 10 wt %, for example, 0.1 wt % to 15 wt % in the electrolyte composition.

In a case in which the amount of the perfluoropolyether oligomer satisfies the above range, the impregnability for the electrode may be improved by reducing the surface tension of the electrolyte composition, and stable mechanical properties by gelation may be secured. In addition, it may prevent disadvantages such as an increase in resistance due to the addition of an excessive amount of the oligomer and the resultant decrease in capacity and restriction of the movement of the lithium ions, for example, a decrease in ionic conductivity.

A weight-average molecular weight (MW) of the perfluoropolyether oligomer may be in a range of 1,000 g/mol to 100,000 g/mol, particularly 1,000 g/mol to 50,000 g/mol, and more particularly 1,000 g/mol to 10,000 g/mol, for example, 1,000 g/mol to 5,000 g/mol, and the range may be controlled by the number of repeating units. In a case in which the weight-average molecular weight of the oligomer is within the above range, mechanical strength of the non-aqueous electrolyte solution including the oligomer may be effectively controlled.

For example, if the weight-average molecular weight of the perfluoropolyether oligomer is 1,000 g/mol or more, the mechanical strength may be improved. Also, if the weight-average molecular weight of the perfluoropolyether oligomer is 100,000 g/mol or less, since physical properties of the oligomer itself are prevented from being rigid and affinity for the electrolyte solvent is increased to allow the oligomer to be easily dissolved, formation of a uniform gel polymer electrolyte may not be expected.

The weight-average molecular weight may be measured using gel permeation chromatography (GPC). For example, a sample having a predetermined concentration is prepared, and alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linearX2, eluent: 0.1M $NaNO_3$ (pH 7.0 phosphate buffer, flow rate: 0.1 mL/min, temp: 40° C., injection: 100 μL).

In the electrolyte composition of the present invention, the compound represented by Formula 1 may be included in an amount of 0.1 part by weight to 50 parts by weight, particularly 0.5 part by weight to 40 parts by weight, and more particularly 1 part by weight to 30 parts by weight based on 100 parts by weight of the perfluoropolyether oligomer.

In a case in which a ratio of a weight of the compound represented by Formula 1 to a weight of the perfluoropolyether oligomer satisfies the above range, since a unit derived from the compound represented by Formula 1 is uniformly distributed in the polymer matrix structure formed of the perfluoropolyether oligomer, a polymer matrix having a flexible structure may be formed and, furthermore, a gel polymer electrolyte with improved mechanical stability and lithium ion mobility may be prepared. That is, if the amount of the compound represented by Formula 1 is 0.1 part by weight or more, a uniform gel polymer matrix may be formed due to an appropriate polymerization reaction, and, if the amount of the compound represented by Formula 1 is less than 50 parts by weight, since a polymerization reaction rate may be controlled to prevent the formation of a polymer matrix having a low molecular weight, mechanical strength of the gel polymer electrolyte may be secured.

(5) Polymerization Initiator

The electrolyte composition of the present invention may further include a polymerization initiator for a polymerization reaction.

The polymerization initiator is a component included to perform a radical reaction required during the preparation of the gel polymer electrolyte, wherein it forms a radical by being dissociated by heat, and may cause a polymerization reaction of the compound represented by Formula 1 and the oligomer represented by Formula 2 by free radical polymerization.

A conventional thermal or photopolymerization initiator known in the art may be used as the polymerization initiator, and non-limiting examples of the polymerization initiator may include organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2-azobis(methylbutyronitrile), 2,2-azobis(iso-butyronitrile) (AIBN), and 2,2'-azobisdimethyl-valeronitrile (AMVN).

The polymerization initiator forms a radical by being dissociated by heat, for a non-limiting example, heat at 30° C. to 100° C. in the battery or by being dissociated at room temperature (25° C. to 30° C.), and the polymerizable oligomer may react with an acrylate-based compound by free radical polymerization to form a gel polymer electrolyte.

The polymerization initiator may be included in an amount of 0.01 part by weight to 10 parts by weight, for example, 0.1 part by weight to 5 parts by weight based on 100 parts by weight of the oligomer represented by Formula 2.

In a case in which the amount of the polymerization initiator satisfies the above range, gel polymer electrolyte properties may be secured by increasing a gel polymer conversion rate, and the wetting of the electrolyte solution with respect to the electrode may be improved by preventing a pre-gel reaction.

Gel Polymer Electrolyte

Also, the present invention may provide a gel polymer electrolyte including a polymer network which is formed by a polymerization reaction of the electrolyte composition of the present invention.

The polymerization reaction may use a conventional polymerization method.

Specifically, the gel polymer electrolyte of the present invention may be prepared by injecting the electrolyte composition of the present invention into a battery case accommodating an electrode assembly, and then performing a polymerization reaction while applying heat, an e-beam, or a gamma ray.

Specifically, the polymerization reaction may be performed by thermal polymerization, and may be performed by reacting for 1 hour to 8 hours while applying heat of about 50° C. to 100° C.

Lithium Secondary Battery

Furthermore, the present invention may provide a lithium secondary battery including a positive electrode, a negative electrode, a separator disposed between the positive electrode and the negative electrode, and the above-described gel polymer electrolyte of the present invention.

In this case, since the gel polymer electrolyte has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum.

Specifically, in terms of the improvement of capacity characteristics and stability of the battery, the positive electrode active material may include at least one of a lithium-cobalt-based oxide (e.g., LiCoO$_2$, etc.) and a lithium-nickel-manganese-cobalt-based oxide represented by the following Formula 3.

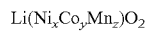   [Formula 3]

(in Formula 3, 0<x<1, 0<y<1, 0<z<1, and x+y+z=1)

Specifically, the lithium-nickel-manganese-cobalt-based oxide may preferably include 50 atm % or more of nickel, and representative examples thereof may include at least one of Li(Ni$_{0.5}$Mn$_{0.3}$Co$_{0.2}$)O$_2$, Li(Ni$_{0.5}$Mn$_{0.2}$Co$_{0.3}$)O$_2$, Li(Ni$_{0.6}$Mn$_{0.2}$Co$_{0.2}$)O$_2$, Li(Ni$_{0.7}$Mn$_{0.15}$Co$_{0.15}$)O$_2$, and Li(Ni$_{0.8}$Mn$_{0.1}$Co$_{0.1}$)O$_2$.

Also, in addition to the lithium-cobalt-based oxide or lithium-nickel-manganese-cobalt-based oxide, the positive electrode active material may further include lithium-manganese-based oxide (e.g., LiMnO$_2$, LiMn$_2$O$_4$, etc.), lithium-nickel-based oxide (e.g., LiNiO$_2$, etc.), lithium-nickel-manganese-based oxide (e.g., LiNi$_{1-Y}$Mn$_Y$O$_2$ (where 0<Y<1), LiMn$_{2-Z}$Ni$_Z$O$_4$ (where 0<Z<2), lithium-nickel-cobalt-based oxide (e.g., LiNi$_{1-Y1}$Co$_{Y1}$O$_2$ (where 0<Y1<1), lithium-manganese-cobalt-based oxide (e.g., LiCo$_{1-Y2}$Mn$_{Y2}$O$_2$ (where 0<Y2<1), LiMn$_{2-Z1}$Co$_{z1}$O$_4$ (where 0<Z1<2), or lithium-nickel-cobalt-transition metal (M) oxide (e.g., Li(Ni$_{p2}$Co$_{q2}$Mn$_{r3}$M$_{S2}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), any one thereof or a compound of two or more thereof may be included, and the positive electrode active material may include $LiMnO_2$, $LiNiO_2$, or lithium nickel cobalt aluminum oxide (e.g., $Li(Ni_{0.8}Co_{0.15}Al_{0.05})O_2$, etc.).

The positive electrode active material may be included in an amount of 90 wt % to 99 wt %, for example, 93 wt % to 98 wt % based on a total weight of solid content in the positive electrode active material layer.

The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, and thermal black; graphite powder such as natural graphite with a well-developed crystal structure, artificial graphite, and graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode active material layer.

The binder is a component that improves the adhesion between positive electrode active material particles and the adhesion between the positive electrode active material and a current collector, wherein the binder is commonly added in an amount of 1 wt % to 30 wt % based on the total weight of the solid content in the positive electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The positive electrode of the present invention as described above may be prepared by a method of preparing a positive electrode which is known in the art. For example, the positive electrode may be prepared by a method in which a positive electrode slurry is prepared by dissolving or dispersing the positive electrode active material, the binder, and/or the conductive agent in a solvent, and a positive electrode collector is coated with the positive electrode slurry, dried, and then rolled to form a positive electrode active material layer, or a method in which the positive electrode active material layer is cast on a separate support and a film separated from the support is then laminated on the positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, microscopic irregularities may be formed on the surface of the positive electrode collector to strengthen the adhesion of the positive electrode active material. The positive electrode collector may include various shapes such as that of a film, a sheet, a foil, a net, a porous body, a foam body, a non-woven fabric body, and the like.

The solvent may include an organic solvent, such as N-methyl-2-pyrrolidone (NMP), and may be used in an amount such that desirable viscosity is obtained when the positive electrode active material as well as optionally the binder and/or the conductive agent are included. For example, the solvent may be included in an amount such that a concentration of the solid content in the active material slurry including the positive electrode active material as well as optionally the binder and/or the conductive agent is in a range of 10 wt % to 70 wt %, for example, 20 wt % to 60 wt %.

(2) Negative Electrode

Next, a negative electrode will be described.

The negative electrode according to the present invention includes a negative electrode active material layer including a negative electrode active material, and the negative electrode active material layer may further include a conductive agent and/or a binder, if necessary.

The negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), Mg, calcium (Ca), strontium (Sr), silicon (Si), antimony (Sb), lead (Pb), indium (In), zinc (Zn), barium (Ba), radium (Ra), germanium (Ge), Al, and tin (Sn) or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode active material layer.

The conductive agent is a component for further improving the conductivity of the negative electrode active material, wherein the conductive agent may be added in an amount of 1 wt % to 20 wt % based on the total weight of the solid content in the negative electrode active material layer. The conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 1 wt % to 30 wt % based on the total weight of the solid content in the negative electrode active material layer. Examples of the binder may be a fluorine resin-based binder including polyvinylidene fluoride or polytetrafluoroethylene; a rubber-based binder including a styrene butadiene rubber, an acrylonitrile-butadiene rubber, or a styrene-isoprene rubber; a cellulose-based binder including carboxymethylcellulose, starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The negative electrode may be prepared by a method of preparing a negative electrode which is known in the art. For example, the negative electrode may be prepared by a method in which a negative electrode active material slurry is prepared by dissolving or dispersing the negative electrode active material as well as optionally the binder and the conductive agent in a solvent, and a negative electrode collector is coated with the negative electrode active material slurry, rolled, and dried to form a negative electrode active material layer, or a method in which the negative electrode active material layer is cast on a separate support and a film separated from the support is then laminated on the negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may include various shapes such as a film, a sheet, a foil, a net, a porous body, a foam body, a non-woven fabric body, and the like.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the active material slurry including the negative electrode active material as well as optionally the binder and the conductive agent is in a range of 50 wt % to 75 wt %, for example, 50 wt % to 65 wt %.

(3) Separator

The lithium secondary battery according to the present invention includes a separator between the positive electrode and the negative electrode.

The separator separates the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

The lithium secondary battery according to the present invention as described above may be suitably used in portable devices, such as mobile phones, notebook computers, and digital cameras, and electric cars such as a hybrid electric vehicle (HEV)

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to examples.

In this case, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Electrolyte Composition Preparation)

After $LiPF_6$ was dissolved in 97.68 g of a non-aqueous organic solvent, in which ethylene carbonate (EC), ethyl methyl carbonate (EMC), ethyl propionate (EP), and propyl propionate (PP) were mixed in a volume ratio of 20:10:20:50, such that a concentration of the $LiPF_6$ was 1.0 M, an electrolyte composition was prepared by adding 2.0 g of the oligomer represented by Formula 2-2 (n2=5, m1=1, m1'=1, k2=4, weight-average molecular weight: 3,000 g/mol), 0.3 g of the compound represented by Formula 1-1, and 0.02 g of a polymerization initiator (see Table 1 below).

(Positive Electrode Preparation)

A positive electrode active material ($LiCoO_2$), a conductive agent (carbon black), and a binder (polyvinylidene fluoride) were added in a weight ratio of 97.5:1:1.5 to N-methyl-2-pyrrolidone (NMP), as a solvent, to prepare a positive electrode active material slurry (solid content concentration 60 wt %). A 15 μm thick positive electrode collector (Al thin film) was coated with the positive electrode active material slurry, dried, and then roll-pressed to prepare a positive electrode.

(Negative Electrode Preparation)

A negative electrode active material (graphite), a conductive agent (carbon black), and a binder (polyvinylidene fluoride) were added to distilled water in a weight ratio of 96:0.5:3.5 to prepare a negative electrode active material slurry (solid content concentration 50 wt %). A 8 μm thick negative electrode collector (Cu thin film) was coated with the negative electrode active material slurry, dried, and then roll-pressed to prepare a negative electrode.

(Secondary Battery Preparation)

After an electrode assembly was prepared by stacking a polyethylene porous film, as a separator, with the positive electrode and negative electrode prepared by the above-described methods, the electrode assembly was put in a battery case, 6 mL of the above electrolyte composition was injected, and the battery case was sealed and then aged for 2 days. Thereafter, a pouch-type lithium secondary battery (4.45 V, 4100 mAh) including a gel polymer electrolyte was prepared by performing a thermal polymerization reaction by curing at 70° C. for 5 hours.

Example 2

A pouch-type lithium secondary battery was prepared in the same manner as in Example 1 except that an electrolyte composition was prepared by adding 1.0 g of the oligomer represented by Formula 2-2, 0.15 g of the compound represented by Formula 1-1, and 0.01 g of a polymerization initiator to 98.84 g of a non-aqueous organic solvent (see Table 1 below).

Example 3

A pouch-type lithium secondary battery was prepared in the same manner as in Example 1 except that an electrolyte composition was prepared by adding the compound represented by Formula 1-2 instead of the compound represented by Formula 1-1 (see Table 1 below).

Example 4

A pouch-type lithium secondary battery was prepared in the same manner as in Example 2 except that an electrolyte composition was prepared by adding the compound represented by Formula 1-2 instead of the compound represented by Formula 1-1 (see Table 1 below).

Example 5

A pouch-type lithium secondary battery was prepared in the same manner as in Example 1 except that an electrolyte composition was prepared by adding 2.0 g of the oligomer represented by Formula 2-2, 0.002 g of the compound represented by Formula 1-1, and 0.02 g of a polymerization initiator to 97.978 g of a non-aqueous organic solvent (see Table 1 below).

Example 6

A pouch-type lithium secondary battery was prepared in the same manner as in Example 1 except that an electrolyte composition was prepared by adding 2.0 g of the oligomer represented by Formula 2-2, 1.0 g of the compound represented by Formula 1-1, and 0.02 g of a polymerization initiator to 96.98 g of a non-aqueous organic solvent (see Table 1 below).

Example 7

A pouch-type lithium secondary battery was prepared in the same manner as in Example 1 except that an electrolyte composition was prepared by adding 2.0 g of the oligomer represented by Formula 2-2, 0.001 g of the compound represented by Formula 1-1, and 0.02 g of a polymerization initiator to 97.979 g of a non-aqueous organic solvent (see Table 1 below).

Example 8

A pouch-type lithium secondary battery was prepared in the same manner as in Example 1 except that an electrolyte composition was prepared by adding 2.0 g of the oligomer represented by Formula 2-2, 1.2 g of the compound represented by Formula 1-1, and 0.02 g of a polymerization initiator to 96.78 g of a non-aqueous organic solvent (see Table 1 below).

Example 9

A lithium secondary battery was prepared in the same manner as in Example 1 except that the oligomer represented by Formula 2-1 (n1=5, k2=7, weight-average molecular weight: 4,000 g/mol) was used instead of using the oligomer represented by Formula 2-2 (see Table 1 below).

Example 10

A lithium secondary battery was prepared in the same manner as in Example 2 except that the oligomer represented by Formula 2-1 was used instead of using the oligomer represented by Formula 2-2 (see Table 1 below).

Comparative Example 1

A lithium secondary battery was prepared in the same manner as in Example 1 except that $LiPF_6$ was dissolved in 100 g of a non-aqueous organic solvent such that a concentration of the $LiPF_6$ was 1.0 M and an electrolyte composition was prepared without adding an additive (see Table 1 below).

Comparative Example 2

A pouch-type lithium secondary battery was prepared in the same manner as in Example 1 except that an electrolyte composition was prepared by only adding 0.02 g of a polymerization initiator and 2.0 g of the oligomer represented by Formula 2-2 to 97.98 g of a non-aqueous organic solvent (see Table 1 below).

Comparative Example 3

A pouch-type lithium secondary battery was prepared in the same manner as in Example 1 except that an electrolyte composition was prepared by only adding 0.3 g of the compound represented by Formula 1-1 to 97.98 g of a non-aqueous organic solvent (see Table 1 below).

Comparative Example 4

A pouch-type lithium secondary battery was prepared in the same manner as in Example 1 except that an electrolyte composition was prepared by adding 0.3 g of a compound represented by Formula 3 below, 2.0 g of the oligomer represented by Formula 2-2, and 0.02 g of a polymerization initiator to 97.68 g of a non-aqueous organic solvent (see Table 1 below).

[Formula 3]

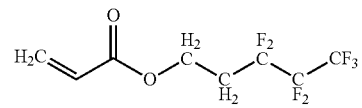

Comparative Example 5

A pouch-type lithium secondary battery was prepared in the same manner as in Example 1 except that an electrolyte composition was prepared by adding 0.3 g of a compound represented by Formula 4 below, 2.0 g of the oligomer represented by Formula 2-2, and 0.02 g of a polymerization initiator to 97.68 g of a non-aqueous organic solvent (see Table 1 below).

[Formula 4]

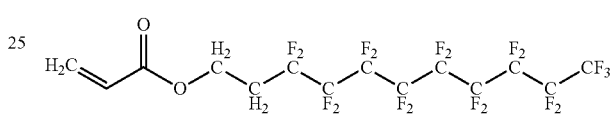

TABLE 1

| | Amount of non-aqueous organic solvent (g) | Monomer Formula | Amount (g) | Oligomer Formula | Weight-average molecular weight (Mw) | Amount (g) | Weight ratio of the oligomer to the monomer | Amount of polymerization initiator (g) |
|---|---|---|---|---|---|---|---|---|
| Example 1 | 97.68 | 1-1 | 0.3 | 2-2 | 3,000 | 2 | 100:15 | 0.02 |
| Example 2 | 98.84 | 1-1 | 0.15 | 2-2 | 3,000 | 1 | 100:15 | 0.01 |
| Example 3 | 97.68 | 1-2 | 0.3 | 2-2 | 3,000 | 2 | 100:15 | 0.02 |
| Example 4 | 98.84 | 1-2 | 0.15 | 2-2 | 3,000 | 1 | 100:15 | 0.01 |
| Example 5 | 97.978 | 1-1 | 0.002 | 2-2 | 3,000 | 2 | 100:0.1 | 0.02 |
| Example 6 | 96.98 | 1-1 | 1 | 2-2 | 3,000 | 2 | 100:50 | 0.02 |
| Example 7 | 97.979 | 1-1 | 0.001 | 2-2 | 3,000 | 2 | 100:0.05 | 0.02 |
| Example 8 | 96.98 | 1-1 | 1.2 | 2-2 | 3,000 | 2 | 100:60 | 0.02 |
| Example 9 | 97.68 | 1-1 | 0.3 | 2-1 | 4,000 | 2 | 100:15 | 0.02 |
| Example 10 | 98.84 | 1-1 | 0.15 | 2-1 | 4,000 | 1 | 100:15 | 0.01 |
| Comparative Example 1 | 100 | — | — | — | — | — | — | — |
| Comparative Example 2 | 97.98 | — | — | 2-2 | 3,000 | 2 | — | 0.02 |
| Comparative Example 3 | 99.70 | 1-1 | 0.3 | — | — | — | — | — |
| Comparative Example 4 | 97.68 | 3 | 0.3 | 2-2 | 3,000 | 2 | 1:15 | 0.02 |
| Comparative Example 5 | 97.68 | 4 | 0.3 | 2-2 | 3,000 | 2 | 1:15 | 0.02 |

EXPERIMENTAL EXAMPLES

Experimental Example 1. Low-Temperature (15° C.) Cycle Characteristics Evaluation Each of the secondary batteries prepared in Examples 1 to 10 and the secondary batteries prepared in Comparative Examples 1 to 5 was activated at a constant current (CC) of 0.1 C. Subsequently, each secondary battery was charged at a CC of 0.33 C to 4.45 V under a constant current-constant voltage (CC-CV) charge condition at 25° C. using PESC05-0.5 charge/discharge equipment (manufacturer: PNE SOLUTION Co., Ltd., 5 V, 500 mA), then subjected to 0.05 C current cut-off, and discharged at 0.33 C to 2.5 V under a CC condition. The above charging and discharging were defined as one cycle and two cycles were performed.

Then, each secondary battery was charged at a constant current-constant voltage of 0.33 C/4.45 V at 15° C. (cut-off 0.05 C), and discharged at 0.2 C to 2.5 V under a CC condition, and the charging and discharging were defined as one cycle and 100 cycles were performed. In this case, capacities were checked by performing 0.1 C discharge at 1 cycle and 50 cycles, and the results thereof are illustrated in FIG. 1.

Referring to FIG. 1, it may be understood that low-temperature cycle capacities of the secondary batteries of Comparative Examples 1 to 5 were reduced in comparison to those of the secondary batteries of Examples 1 to 10 of the present invention.

With respect to the secondary battery of Example 7 in which the compound represented by Formula 1 was included in a somewhat smaller amount than the perfluoropolyether oligomer in the electrolyte composition, since lithium ion conductivity was reduced as the amount of the compound represented by Formula 1 in the polymer network structure was decreased, it may be understood that the low-temperature cycle capacity was somewhat reduced in comparison to those of the secondary batteries of Examples 1 to 6.

Also, with respect to the secondary battery of Example 8 in which the compound represented by the Formula 1 is included in an amount that is greater than 50 parts by weight based on 100 parts by weight of the perfluoropolyether oligomer in the electrolyte composition, since a decrease in matrix molecular weight not only occurred due to a rapid polymerization reaction rate, but resistance was also increased while a thick film was formed on the surface of the electrode, it may be understood that the low-temperature cycle capacity was relatively reduced in comparison to those of the secondary batteries of Examples 1 to 6.

Experimental Example 2. High-Temperature (45° C.) Cycle Characteristics Evaluation Each of the secondary batteries prepared in Examples 1 to 10 and the secondary batteries prepared in Comparative Examples 1 to 5 was activated at a CC of 0.1 C. Subsequently, each secondary battery was charged at a CC of 0.33 C to 4.45 V under a constant current-constant voltage (CC-CV) charge condition at 25° C. using PESC05-0.5 charge/discharge equipment (manufacturer: PNE SOLUTION Co., Ltd., 5 V, 500 mA), then subjected to 0.05 C current cut-off, and discharged at 0.33 C to 2.5 V under a CC condition. The above charging and discharging were defined as one cycle and two cycles were performed.

Then, each secondary battery was charged at a constant current-constant voltage of 0.33 C/4.45 V at 45° C. (cut-off 0.05 C), and discharged at 0.5° C. to 2.5 V under a CC condition, and the charging and discharging were defined as one cycle and 100 cycles were performed. In this case, capacities were checked by performing 0.1 C discharge at 1 cycle and 50 cycles, and the results thereof are illustrated in FIG. 2.

Figure 2:
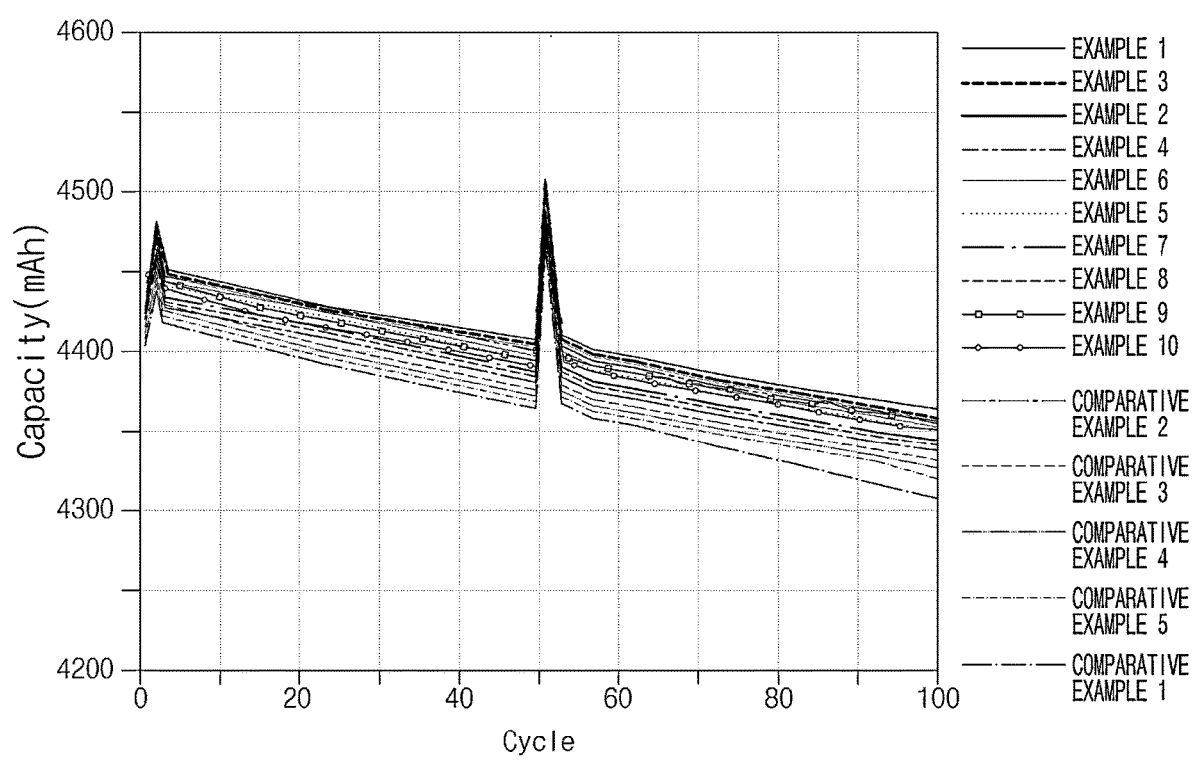
FIG. 2 is a graph illustrating the evaluation results of high-temperature cycle characteristics of a secondary battery according to Experimental Example 2.

Referring to FIG. 2, it may be understood that high-temperature cycle capacities of the secondary batteries of Examples 1 to 10 of the present invention were improved in comparison to those of the secondary batteries of Comparative Examples 1 to 5.

With respect to the secondary battery of Example 7 in which the compound represented by Formula 1 was included in a somewhat smaller amount than the perfluoropolyether oligomer in the electrolyte composition, since the lithium ion conductivity was reduced as the amount of the compound represented by Formula 1 in the polymer network structure was decreased, it may be understood that the high-temperature cycle capacity was somewhat reduced in comparison to those of the secondary batteries of Examples 1 to 6.

Also, with respect to the secondary battery of Example 8 in which the compound represented by Formula 1 is included in an amount that is greater than 50 parts by weight based on 100 parts by weight of the perfluoropolyether oligomer in the electrolyte composition, since the decrease in matrix molecular weight occurred due to the rapid polymerization reaction rate, mechanical strength of the gel polymer electrolyte was reduced, and thus, it may be understood that the high-temperature cycle capacity was relatively reduced in comparison to those of the secondary batteries of Examples 1 to 6.

The invention claimed is:

1. An electrolyte composition comprising:

a lithium salt;

a non-aqueous organic solvent;

a perfluoropolyether oligomer including an acrylate group at both ends of a structure of the perfluoropolyether oligomer, the perfluoropolyether oligomer having a weight-average molecular weight in a range of 3.000 g/mol to 100,000 g/mol; and a compound represented by Formula 1:

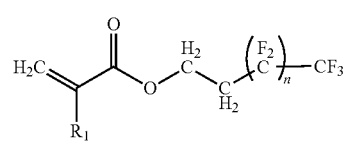

Formula 1 wherein, in the Formula 1, $R_1$ is hydrogen or an alkyl group having 1 to 3 carbon atoms, and n is an integer of 3 to 8.

2. The electrolyte composition of claim 1, wherein, in the Formula 1, $R_1$ is hydrogen, and n is an integer of 4 to 8.

3. The electrolyte composition of claim 1, wherein, in the Formula 1, $R_1$ is hydrogen, and n is an integer of 5 to 8.

4. The electrolyte composition of claim 1, wherein the compound represented by the Formula 1 includes at least one of an oligomer represented by Formula 1-1 and an oligomer represented by Formula 1-2:

Formula 1-1

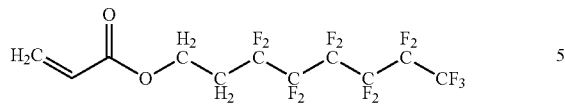

Formula 1-2

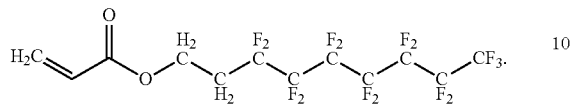

5. The electrolyte composition of claim 2, wherein the perfluoropolyether oligomer comprises an oligomer represented by Formula 2:

Formula 2

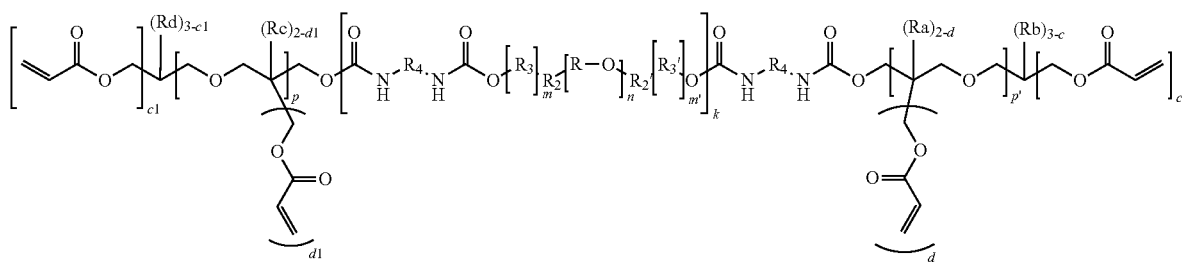

wherein, in the Formula 2,
R is an alkylene group having 1 to 4 carbon atoms which is unsubstituted or substituted with fluorine,
$R_2$ and $R_2'$ are each independently an alkylene group having 1 to 5 carbon atoms or $-(CF_2)_o-O-$, o is an integer of 1 to 3, $R_3$ and $R_3'$ are each independently an alkylene group having 1 to 5 carbon atoms or $-(R_5)_{o2}-O-$, $R_5$ is an unsubstituted or substituted alkylene group having 1 to 5 carbon atoms, and o2 is an integer of 1 to 3,
$R_4$ is an aliphatic hydrocarbon group, an alicyclic hydrocarbon group, or an aromatic hydrocarbon group,
Ra, Rb, Rc, and Rd are each independently hydrogen or an alkyl group having 1 to 3 carbon atoms,
n, m, and m' are each independently an integer of 1 to 10,
k is an integer of 10 to 1,000,
p and p' are each independently an integer of 0 or 1,
c and c1 are each independently an integer of 1 to 3, and
d and d1 are each independently an integer of 1 or 2.

6. The electrolyte composition of claim 5, wherein, in the Formula 2,
R is an alkylene group having 2 to 4 carbon atoms which is unsubstituted or substituted with fluorine,
$R_2$ and $R_2'$ are each independently an alkylene group having 1 to 3 carbon atoms or $-(CF_2)_o-O-$, o is an integer of 1 to 3,
$R_3$ and $R_3'$ are each independently an alkylene group having 2 to 5 carbon atoms or $-(R_5)_{o2}-O-$, $R_5$ is an unsubstituted or substituted alkylene group having 2 to 5 carbon atoms, and o2 is an integer of 1 to 3,
$R_4$ is an alicyclic hydrocarbon group, and
Ra, Rb, Rc, and Rd are each independently hydrogen or an alkyl group having 1 or 2 carbon atoms.

7. The electrolyte composition of claim 5, wherein the oligomer represented by the Formula 2 comprises at least one of an oligomer represented by Formula 2-1 and an oligomer represented by Formula 2-2:

Formula 2-1

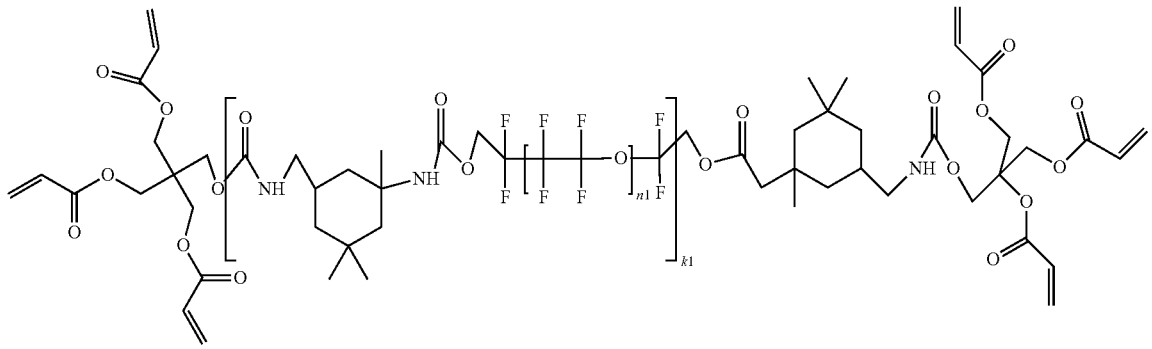

wherein, in the Formula 2-1,
n1 is an integer of 1 to 10, and
k1 is an integer of 10 to 1,000,

[Formula 2-2]

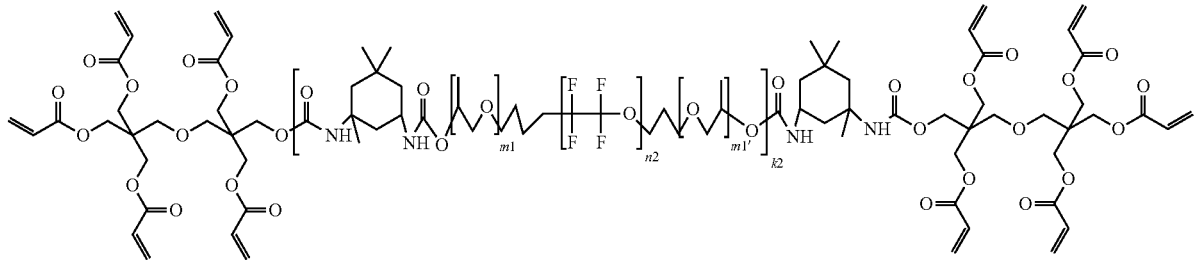

wherein, in the Formula 2-2,
n2, m1, and m1' are each independently an integer of 1 to 10, and
k2 is an integer of 10 to 1,000.

8. The electrolyte composition of claim 7, wherein the oligomer represented by the Formula 2 is the oligomer represented by the Formula 2-2.

9. The electrolyte composition of claim 1, wherein the perfluoropolyether oligomer is included in an amount of 0.1 wt % to 10 wt % based on a total weight of the electrolyte composition.

10. The electrolyte composition of claim 1, wherein the compound represented by the Formula 1 is included in an amount of 0.1 part by weight to 50 parts by weight based on 100 parts by weight of the perfluoropolyether oligomer.

11. The electrolyte composition of claim 1, wherein the compound represented by the Formula 1 is included in an amount of 0.5 part by weight to 40 parts by weight based on 100 parts by weight of the perfluoropolyether oligomer.

12. The electrolyte composition of claim 1, further comprising a polymerization initiator.

13. A gel polymer electrolyte comprising a polymer network including a polymerized product of the electrolyte composition of claim 1.

14. A lithium secondary battery comprising a positive electrode; a negative electrode; a separator disposed between the positive electrode and the negative electrode; and the gel polymer electrolyte of claim 13.

15. The electrolyte composition of claim 4, wherein the compound represented by the Formula 1 includes the oligomer represented by Formula 1-1.

16. The electrolyte composition of claim 1, wherein the compound represented by the Formula 1 is included in an amount of 1 part by weight to 30 parts by weight based on 100 parts by weight of the perfluoropolyether oligomer.

17. An electrolyte composition comprising:
a lithium salt;
a non-aqueous organic solvent;
a perfluoropolyether oligomer comprising an oligomer represented by Formula 2; and
a compound represented by Formula 1,
wherein the Formula 1 and Formula 2 are:

Formula 1

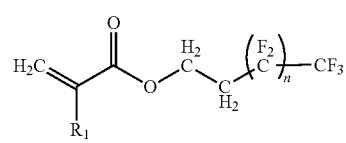

wherein, in the Formula 1,
$R_1$ is hydrogen or an alkyl group having 1 to 3 carbon atoms, and
n is an integer of 3 to 8;

Formula 2

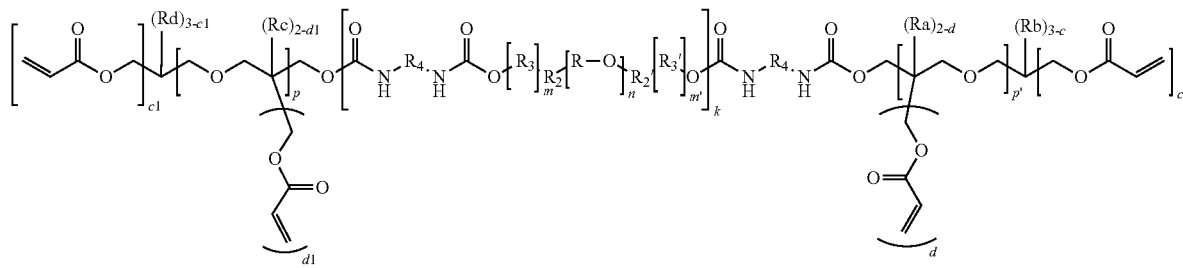

wherein, in the Formula 2,

R is an alkylene group having 1 to 4 carbon atoms which is unsubstituted or substituted with fluorine, $R_2$ and $R_2'$ are each independently an alkylene group having 1 to 5 carbon atoms or $-(CF_2)_o-O-$, o is an integer of 1 to 3, at least one selected from R, $R_2$, and $R_2'$ is a perfluorinated group, $R_3$ and $R_3'$ are each independently an alkylene group having 1 to 5 carbon atoms or $-(R_5)_{o2}-O-$, $R_5$ is an unsubstituted or substituted alkylene group having 1 to 5 carbon atoms, and o2 is an integer of 1 to 3, $R_4$ is an aliphatic hydrocarbon group, an alicyclic hydrocarbon group, or an aromatic hydrocarbon group, Ra, Rb, Rc, and Rd are each independently hydrogen or an alkyl group having 1 to 3 carbon atoms, n, m, and m' are each independently an integer of 1 to 10, k is an integer of 10 to 1,000, p and p' are each independently an integer of 0 or 1, c and c1 are each independently an integer of 1 to 3, and d and d1 are each independently an integer of 1 or 2.

18. The electrolyte composition of claim 17, wherein the compound represented by the Formula 1 is included in an amount of 0.1 part by weight to 50 parts by weight based on 100 parts by weight of the perfluoropolyether oligomer.

19. The electrolyte composition of claim 18, wherein the oligomer represented by the Formula 2 comprises at least one of an oligomer represented by Formula 2-1 and an oligomer represented by Formula 2-2:

Formula 2-1

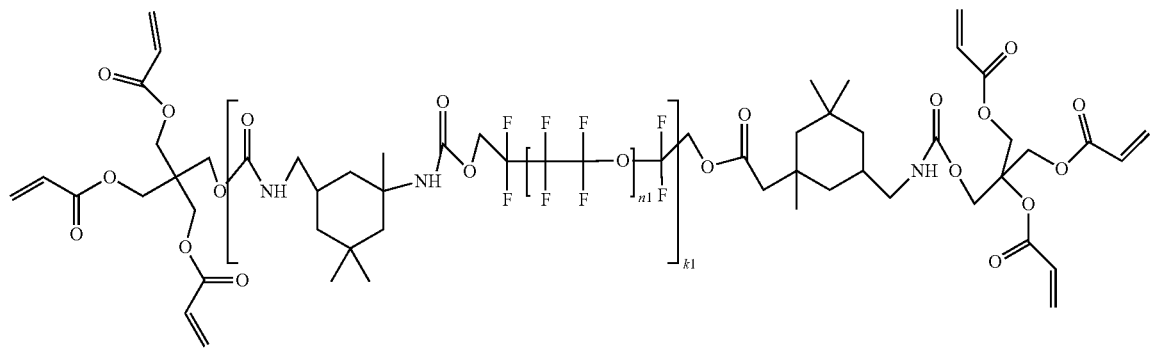

wherein, in the Formula 2-1,
n1 is an integer of 1 to 10, and
k1 is an integer of 10 to 1,000,

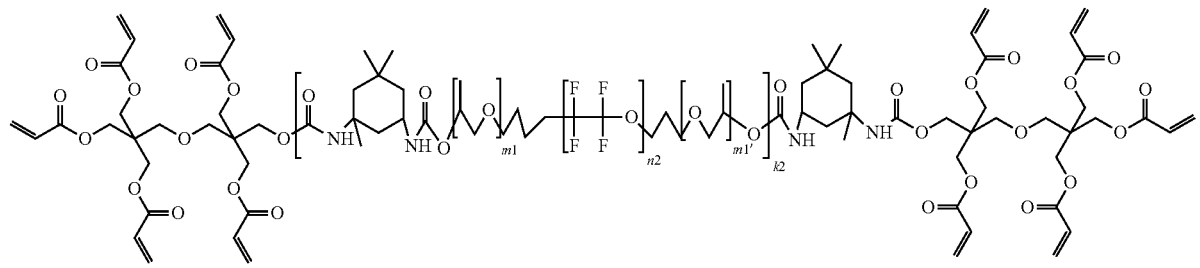

[Formula 2-2]

wherein, in the Formula 2-2,
n2, m1, and m1' are each independently an integer of 1 to 10, and
k2 is an integer of 10 to 1,000.

20. The electrolyte composition of claim 19, wherein, in the Formula 1, $R_1$ is hydrogen, and n is 5 or 8.

21. The electrolyte composition of claim 1, wherein the perfluoropolyether oligomer further includes a urethane group, a urea group or both in the structure.

* * * * *